United States Patent
Kawano et al.

(10) Patent No.: US 10,922,043 B2
(45) Date of Patent: Feb. 16, 2021

(54) INFORMATION PROCESSING DEVICE AND INFORMATION PROCESSING METHOD FOR ACQUIRING INFORMATION ASSOCIATED WITH A TARGET

(71) Applicant: SONY CORPORATION, Tokyo (JP)

(72) Inventors: Shinichi Kawano, Tokyo (JP); Takuya Namae, Kanagawa (JP); Ryo Fukazawa, Kanagawa (JP); Kenji Sugihara, Kanagawa (JP); Daisuke Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 126 days.

(21) Appl. No.: 16/307,351

(22) PCT Filed: Jun. 8, 2017

(86) PCT No.: PCT/JP2017/021272
§ 371 (c)(1),
(2) Date: Dec. 5, 2018

(87) PCT Pub. No.: WO2017/221721
PCT Pub. Date: Dec. 28, 2017

(65) Prior Publication Data
US 2019/0138261 A1    May 9, 2019

(30) Foreign Application Priority Data

Jun. 22, 2016 (JP) ................................ 2016-123594

(51) Int. Cl.
*G06F 3/16* (2006.01)
*G06F 3/01* (2006.01)
(Continued)

(52) U.S. Cl.
CPC ............... *G06F 3/16* (2013.01); *G06F 3/01* (2013.01); *G06F 3/017* (2013.01); *G06F 3/038* (2013.01);
(Continued)

(58) Field of Classification Search
CPC ............. G06F 3/048; G06F 3/16; G06F 40/58
(Continued)

(56) References Cited

U.S. PATENT DOCUMENTS 8,195,386 B2 * 6/2012 Hu ...................... G01C 21/3647
345/7
8,988,494 B2 * 3/2015 Imai ...................... H04N 13/361
348/42

(Continued)

FOREIGN PATENT DOCUMENTS

JP    2002-207732 A    7/2002
JP    2010-152570 A    7/2010
(Continued)

OTHER PUBLICATIONS

International Search Report and Written Opinion of PCT Application No. PCT/JP2017/021272, dated Aug. 1, 2017, 09 pages of ISRWO.

*Primary Examiner* — Susan I McFadden
(74) *Attorney, Agent, or Firm* — Chip Law Group

(57) ABSTRACT

The present disclosure relates to an information processing device and an information processing method, which are capable of acquiring accurate information associated with a desired target which is pointed by a user. The information processing device includes an indication target detection unit that detects an indication target that is pointed by an indicating object. An information generation unit generates explanatory information that includes content information indicating visually recognizable content of the indication (Continued)

target and additive information indicating visually recognizable characteristics associated with the indication target. An output control unit controls output of a voice of the explanatory information.

12 Claims, 11 Drawing Sheets

(51) Int. Cl.
G06F 3/0481 (2013.01)
G06F 3/038 (2013.01)
G06F 3/0484 (2013.01)
G06F 40/58 (2020.01)

(52) U.S. Cl.
CPC ...... *G06F 3/04812* (2013.01); *G06F 3/04842* (2013.01); *G06F 40/58* (2020.01); *G06F 2203/04803* (2013.01)

(58) Field of Classification Search
USPC .......................................................... 704/277
See application file for complete search history.

(56) References Cited

U.S. PATENT DOCUMENTS

| | | | | |
|---|---|---|---|---|
| 10,223,064 | B2* | 3/2019 | Goi | G06F 1/163 |
| 10,474,226 | B2* | 11/2019 | Nishizawa | G06F 3/0346 |
| 10,788,902 | B2* | 9/2020 | Kawano | G06F 3/0418 |
| 2014/0292653 | A1 | 10/2014 | Kamba et al. | |
| 2019/0138117 | A1* | 5/2019 | Kawano | G06F 3/0418 |
| 2019/0371280 | A1* | 12/2019 | Taki | G09G 5/38 |

FOREIGN PATENT DOCUMENTS

| | | |
|---|---|---|
| JP | 2013-054661 A | 3/2013 |
| JP | 2013-088906 A | 5/2013 |
| WO | 2013/035758 A1 | 3/2013 |

* cited by examiner

FIG. 8

| ID | POSITION | SIZE | OBJECT TYPE | CONTENT TYPE | DETAIL INFORMATION ||||| ADJACENT OBJECT |||
|---|---|---|---|---|---|---|---|---|---|---|---|---|
| | | | | | CONTENT INFORMATION | TRANSLATION INFORMATION (USER LANGUAGE) | FOREGROUND COLOR | BACKGROUND COLOR | SHAPE | UPPER | LOWER | LEFT | RIGHT |
| ID1 | p1 | s1 | SIGNBOARD | SENTENCE | ORIGINAL LANGUAGE INFORMATION OF SIGNBOARD 131 | 6F OF THIS BUILDING | WHITE | GREEN | RECTANGULAR SHAPE | — | — | — | ID5 |
| ID2 | p2 | s2 | SIGNBOARD | SENTENCE | ORIGINAL LANGUAGE INFORMATION OF SIGNBOARD 132 | TASTE OF HOME COOKING | WHITE | BLUE | RECTANGULAR SHAPE | — | ID6 | ID1 | ID3 |
| ID3 | p3 | s3 | WINDOW | OBJECT | WINDOW | WINDOW | TRANSPARENT | GRAY | SQUARE SHAPE | — | ID6 | ID2 | ID4 |
| ID4 | p4 | s4 | SIGNBOARD | IMAGE | DOG | DOG | YELLOW | WHITE | RECTANGULAR SHAPE | — | ID7 | ID3 | — |
| ID5 | p5 | s5 | SIGNBOARD | WORD | ORIGINAL LANGUAGE INFORMATION OF SIGNBOARD 135 | RESTAURANT | WHITE | BLUE | ELLIPTICAL SHAPE | ID2 | ID8 | ID1 | ID6 |
| ID6 | p6 | s6 | SIGNBOARD | WORD | ORIGINAL LANGUAGE INFORMATION OF SIGNBOARD 136 | SPORTS GOODS | WHITE | BLUE | ELLIPTICAL SHAPE | ID3 | — | ID5 | ID7 |
| ID7 | p7 | s7 | SIGNBOARD | WORD | ORIGINAL LANGUAGE INFORMATION OF SIGNBOARD 137 | PET SHOP | WHITE | BLUE | ELLIPTICAL SHAPE | ID4 | — | ID6 | — |
| ID8 | p8 | s8 | SIGNBOARD | SENTENCE | ORIGINAL LANGUAGE INFORMATION OF SIGNBOARD 138 | 5F OF THIS BUILDING | BLACK | YELLOW | RECTANGULAR SHAPE | ID5 | — | ID1 | — |

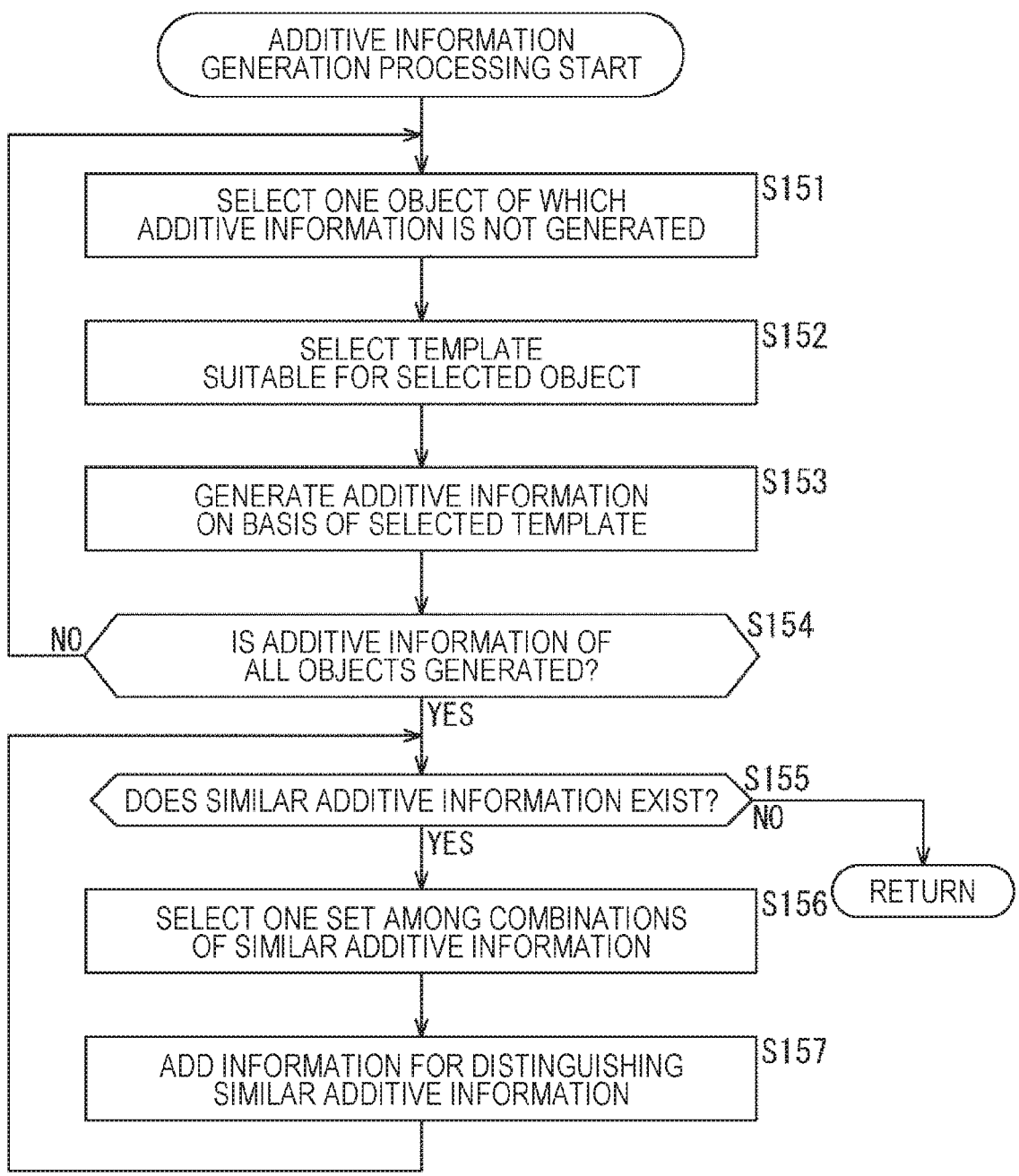

FIG. 10

| ID | ADDITIVE INFORMATION |
|---|---|
| ID1 | "RECTANGULAR" SIGNBOARD IN WHICH "WHITE" "SENTENCE" IS DISPLAYED ON "GREEN" BACKGROUND |
| ID2 | "RECTANGULAR" SIGNBOARD IN WHICH "WHITE" "SENTENCE" IS DISPLAYED ON "BLUE" BACKGROUND |
| ID3 | "SQUARE" WINDOW THAT IS "TRANSPARENT" AND INCLUDES "GRAY" FRAME |
| ID4 | "RECTANGULAR" SIGNBOARD IN WHICH "YELLOW" "IMAGE" IS DISPLAYED ON "WHITE" BACKGROUND |
| ID5 | "ELLIPTICAL" SIGNBOARD IN WHICH "WHITE" "WORD" IS DISPLAYED ON "BLUE" BACKGROUND |
| ID6 | "ELLIPTICAL" SIGNBOARD IN WHICH "WHITE" "WORD" IS DISPLAYED ON "BLUE" BACKGROUND |
| ID7 | "ELLIPTICAL" SIGNBOARD IN WHICH "WHITE" "WORD" IS DISPLAYED ON "BLUE" BACKGROUND |
| ID8 | "RECTANGULAR" SIGNBOARD IN WHICH "BLACK" "SENTENCE" IS DISPLAYED ON "YELLOW" BACKGROUND |

FIG. 11

| ID | ADDITIVE INFORMATION |
|---|---|
| ID1 | "RECTANGULAR" SIGNBOARD IN WHICH "WHITE" "SENTENCE" IS DISPLAYED ON "GREEN" BACKGROUND |
| ID2 | "RECTANGULAR" SIGNBOARD IN WHICH "WHITE" "SENTENCE" IS DISPLAYED ON "BLUE" BACKGROUND |
| ID3 | "SQUARE" WINDOW THAT IS "TRANSPARENT" AND INCLUDES "GRAY" FRAME |
| ID4 | "RECTANGULAR" SIGNBOARD IN WHICH "YELLOW" "FIGURE" IS DISPLAYED ON "WHITE" BACKGROUND |
| ID5 | "FIRST" "SIGNBOARD" FROM "LEFT" AMONG "ELLIPTICAL" SIGNBOARDS IN WHICH "WHITE" "WORD" IS DISPLAYED ON "BLUE" BACKGROUND |
| ID6 | "SECOND" "SIGNBOARD" FORM "LEFT" AMONG "ELLIPTICAL" SIGNBOARDS IN WHICH "WHITE" "WORD" IS DISPLAYED ON "BLUE" BACKGROUND |
| ID7 | "THIRD" "SIGNBOARD" FROM "LEFT" AMONG "ELLIPTICAL" SIGNBOARDS IN WHICH "WHITE" "WORD" IS DISPLAYED ON "BLUE" BACKGROUND |
| ID8 | "RECTANGULAR" SIGNBOARD IN WHICH "BLACK" "SENTENCE" IS DISPLAYED ON "YELLOW" BACKGROUND |

FIG. 12

| ID | ADDITIVE INFORMATION |
|---|---|
| ID1 | "RECTANGULAR" SIGNBOARD IN WHICH "WHITE" "SENTENCE" IS DISPLAYED ON "GREEN" BACKGROUND |
| ID2 | "RECTANGULAR" SIGNBOARD IN WHICH "WHITE" "SENTENCE" IS DISPLAYED ON "BLUE" BACKGROUND |
| ID3 | "SQUARE" WINDOW THAT IS "TRANSPARENT" AND INCLUDES "GRAY" FRAME |
| ID4 | "RECTANGULAR" SIGNBOARD IN WHICH "YELLOW" "FIGURE" IS DISPLAYED ON "WHITE" BACKGROUND |
| ID5 | "SIGNBOARD" IN WHICH "GREEN SIGNBOARD" EXISTS ON "LEFT" SIDE AMONG "ELLIPTICAL" SIGNBOARDS IN WHICH "WHITE" "WORD" IS DISPLAYED ON "BLUE" BACKGROUND |
| ID6 | "SIGNBOARD" IN WHICH "WINDOW" EXISTS ON "UPPER" SIDE AMONG "ELLIPTICAL" SIGNBOARDS IN WHICH "WHITE" "WORD" IS DISPLAYED ON "BLUE" BACKGROUND |
| ID7 | "SIGNBOARD" IN WHICH "YELLOW IMAGE" EXISTS ON "UPPER" SIDE AMONG "ELLIPTICAL" SIGNBOARDS IN WHICH "WHITE" "WORD" IS DISPLAYED ON "BLUE" BACKGROUND |
| ID8 | "RECTANGULAR" SIGNBOARD IN WHICH "BLACK" "SENTENCE" IS DISPLAYED ON "YELLOW" BACKGROUND |

…

INFORMATION PROCESSING DEVICE AND INFORMATION PROCESSING METHOD FOR ACQUIRING INFORMATION ASSOCIATED WITH A TARGET

CROSS REFERENCE TO RELATED APPLICATIONS

This application is a U.S. National Phase of International Patent Application No. PCT/JP2017/021272 filed on Jun. 8, 2017, which claims priority benefit of Japanese Patent Application No. JP 2016-123594 filed in the Japan Patent Office on Jun. 22, 2016. Each of the above-referenced applications is hereby incorporated herein by reference in its entirety.

TECHNICAL FIELD

The present technology relates to an information processing device, an information processing method, and a program, and more particularly, to an information processing device, an information processing method, and a program which are suitable to be used in a case of giving a notification of information associated with a target that is pointed by an indicating object.

BACKGROUND ART

For example, it is difficult to more accurately point a distant object, a small object, an object in objects densely arranged around the object, and the like with a finger and the like from a distant position without coming into direct contact with the object. Accordingly, for example, in a device to which a technology of detecting the target pointed by a user is applied, a target that is recognized by the device as being pointed by the user, and a target that is recognized by the user as being pointed may not match each other.

With regard to this, in the related art, there is suggested a technology in which the name and the like of a target that is recognized as being pointed by a user's finger and the like is given in notification with a voice to be confirmed by the user (for example, refer to Patent Document 1).

CITATION LIST

Patent Document

Patent Document 1: Japanese Patent Application Laid-Open No. 2013-88906

SUMMARY OF THE INVENTION

Problems to be Solved by the Invention

However, in the technology described in Patent Document 1, for example, in a case where a user points one object among a plurality of unknown objects, there is a possibility that the recognition mismatching occurs, and even when a name and the like of an object different from a target recognized as being pointed by a user is given in notification with a voice, the user fails to notice this situation.

Here, an object of the present technology allows a user to acquire accurate information associated with a desired target by pointing the desired target.

Solutions to Problems

According to an aspect of the present technology, there is provided an information processing device including: an indication target detection unit that detects an indication target that is a target pointed by an indicating object in a three-dimensional space; an information generation unit that generates explanatory information that includes content information indicating visually recognizable content of the indication target, and additive information indicating visually recognizable characteristics associated with the indication target; and an output control unit that controls output of a voice of the explanatory information.

The information generation unit can compare the visually recognizable characteristics of the individual indication target, and visually recognizable characteristics at a periphery of the indication target to control an information amount of the additive information.

The information generation unit can control the information amount of the additive information to a certain extent capable of identifying the indication target from the periphery.

The information generation unit can generate the additive information on the basis of only the visually recognizable characteristics of the individual indication target in a case where the visually recognizable characteristics of the individual indication target and the visually recognizable characteristics at the periphery of the indication target are not similar, and can generate the additive information on the basis of at least one of a position of the indication target and the visually recognizable characteristics at the periphery of the indication target, in addition to the visually recognizable characteristics of the individual indication target in a case where the visually recognizable characteristics of the individual indication target and the visually recognizable characteristics at the periphery of the indication target are similar.

In the case of generating the additive information on the basis of only the visually recognizable characteristics of the individual indication target, the information generation unit allows a characteristic, which is different from the visually recognizable characteristics of the periphery of the indication target, among the visually recognizable characteristics of the individual indication target to be preferentially included in the additive information.

The visually recognizable characteristics of the individual indication target can include a visual attribute of the indication target.

The information processing device can further include a translation unit that translates the content information into a predetermined language. The output control unit may control output of a voice of the explanatory information in the predetermined language.

The content information can indicate at least one of a name of the indication target, a type of the indication target, and a thing that is visually expressed by the indication target.

The indicating object can be a part of a body of a user.

The information processing device can further include an object detection unit that performs detection of an object in an image obtained by photographing the periphery of the indication target. The indication target detection unit detects the indication target among objects in the image.

According to another aspect of the present technology, there is provided an information processing method including: an indication target detection step of detecting an indication target that is a target pointed by an indicating object; an information generation step of generating explanatory information that includes content information indicating visually recognizable content of the indication target, and additive information indicating visually recognizable characteristics associated with the indication target; and an output control step of controlling output of a voice of the explanatory information.

According to still another aspect of the present technology, there is provided a program that causes a computer to execute processing including: an indication target detection step of detecting an indication target that is a target pointed by an indicating object in a three-dimensional space; an information generation step of generating explanatory information that includes content information indicating visually recognizable content of the indication target, and additive information indicating visually recognizable characteristics associated with the indication target; and an output control step of controlling output of a voice of the explanatory information.

According to the aspect of the present technology, an indication target that is a target pointed by an indicating object in a three-dimensional space is detected, explanatory information, which includes content information indicating visually recognizable content of the indication target, and additive information indicating visually recognizable characteristics associated with the indication target, is generated, and output of a voice of the explanatory information is controlled.

Effects of the Invention

According to an aspect of the present technology, it is possible to accurately acquire information associated with a desired target by a user pointing the desired target.

Furthermore, the effect described here is not limited, and may be any one effect described in the present disclosure.

BRIEF DESCRIPTION OF DRAWINGS

FIG. 8 is a diagram illustrating an example of an indication direction information list.

FIG. 9 is a flowchart illustrating details of additive information generation processing.

FIG. 10 is a diagram illustrating an example of additive information.

FIG. 11 is a diagram illustrating an example of the additive information.

FIG. 12 is a diagram illustrating an example of the additive information.

MODE FOR CARRYING OUT THE INVENTION

Figure 1:
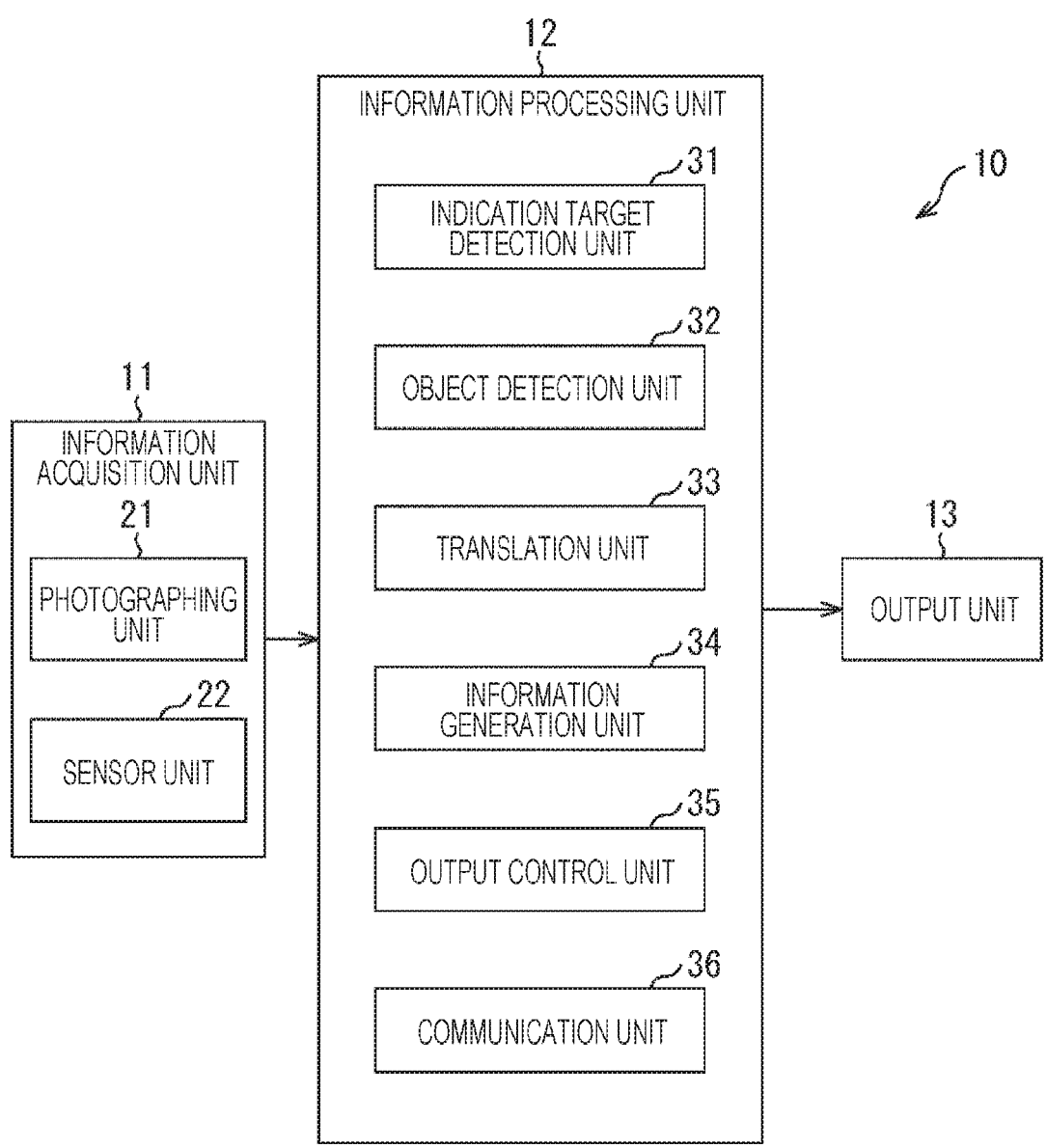
FIG. 1 is a block diagram illustrating an embodiment of an information processing system to which the present technology is applied.

Hereinafter, a mode for carrying out the invention (hereinafter, referred to as "embodiment") will be described in detail with reference to the accompanying drawings. Furthermore, description will be made in the following order.
1. Embodiment
2. Modification Example 1. Embodiment {Configuration Example of Information Processing System 10}

First, a configuration example of an information processing system 10 to which the present technology is applied will be described with reference to FIG. 1.

For example, the information processing system 10 is a system that is mounted on or carried by a user, and gives a notification of content information associated with a target (hereinafter, referred to as "indication target") pointed by a finger of the user in a three-dimensional space with a voice in a predetermined language.

Here, the content information is information indicating visually recognizable object content. For example, the content information indicates at least one of the name of the object, an object type, and things (hereinafter, referred to as "visual contents") which are visually expressed by the object. Here, examples of the visual contents include an image (a moving image, a still image, a figure, and the like), a character, and a mark which are expressed by the object, and a character, a mark, and a message which are expressed by a shape or movement of the object. In addition, in a case where the object is a human being, examples of the visually recognizable content include a gesture such as a body language and a traffic-control hand signal, and a facial expression.

The information processing system 10 includes an information acquisition unit 11, an information processing unit 12, and an output unit 13.

For example, the information acquisition unit 11 has a finger ring shape, and is mounted on a finger (for example, a forefinger) that is used when the user points something. The information acquisition unit 11 includes a photographing unit 21 and a sensor unit 22.

The photographing unit 21 photographs a direction (hereinafter, referred to as "indication direction") pointed by the user's finger, and supplies an image (hereinafter, referred to as "indication direction image") obtained from the photographing to the information processing unit 12.

For example, the sensor unit 22 includes a sensor (for example, an acceleration sensor and a gyro sensor) configured to detect a gesture by the user's finger, a position of the finger, an indication direction, and the like. In addition, the sensor unit 22 supplies sensor signals indicating detection results of the sensors to the information processing unit 12.

For example, the information processing unit 12 is constituted by a portable information terminal such as a smartphone, a tablet, and a wearable device. For example, the information processing unit 12 includes an indication target detection unit 31, an object detection unit 32, a translation unit 33, an information generation unit 34, an output control unit 35, and a communication unit 36.

The indication target detection unit 31 performs detection of a target that is pointed by a user in a three-dimensional space on the basis of sensor information transmitted from the sensor unit 22.

The object detection unit 32 performs detection of an object in the indication direction image.

The translation unit 33 performs translation between two or more languages.

The information generation unit 34 generates an indication direction information list indicating information associated with an object that exists in a direction pointed by the user, and the like. Furthermore, details of the indication direction information list will be described later. In addition, the information generation unit 34 generates explanatory information that is information for performing explanation of the indication target. For example, the explanatory information includes content information of the indication target, and additive information indicating visually recognizable characteristics associated with the indication target.

The output control unit 35 controls output of a voice by the output unit 13.

The communication unit 36 performs communication between the information acquisition unit 11 and the output unit 13. Furthermore, a communication method of the communication unit 36 is not limited to a predetermined method, and it is possible to employ an arbitrary method among various communication methods including a wired method and a wireless method. In addition, the communication method between the information acquisition unit 11 and the output unit 13 can be set to methods different from each other.

The output unit 13 is constituted by a device that can output a voice. For example, the output unit 13 is constituted by a speaker, a headphone, an earphone, a sound source, and the like.

Furthermore, for example, the information processing unit 12 and the output unit 13 may be integrated with each other. For example, an integrated device is constituted by a neckband-type wearable device.

{Processing of Information Processing System 10}

Next, processing of the information processing system 10 will be described with reference to FIG. 2 to FIG. 12.

Figure 2:
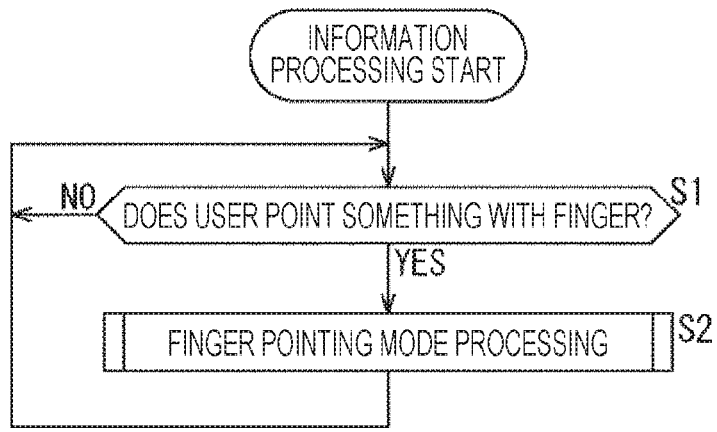
FIG. 2 is a flowchart illustrating information processing that is executed by the information processing system.
Figure 3:
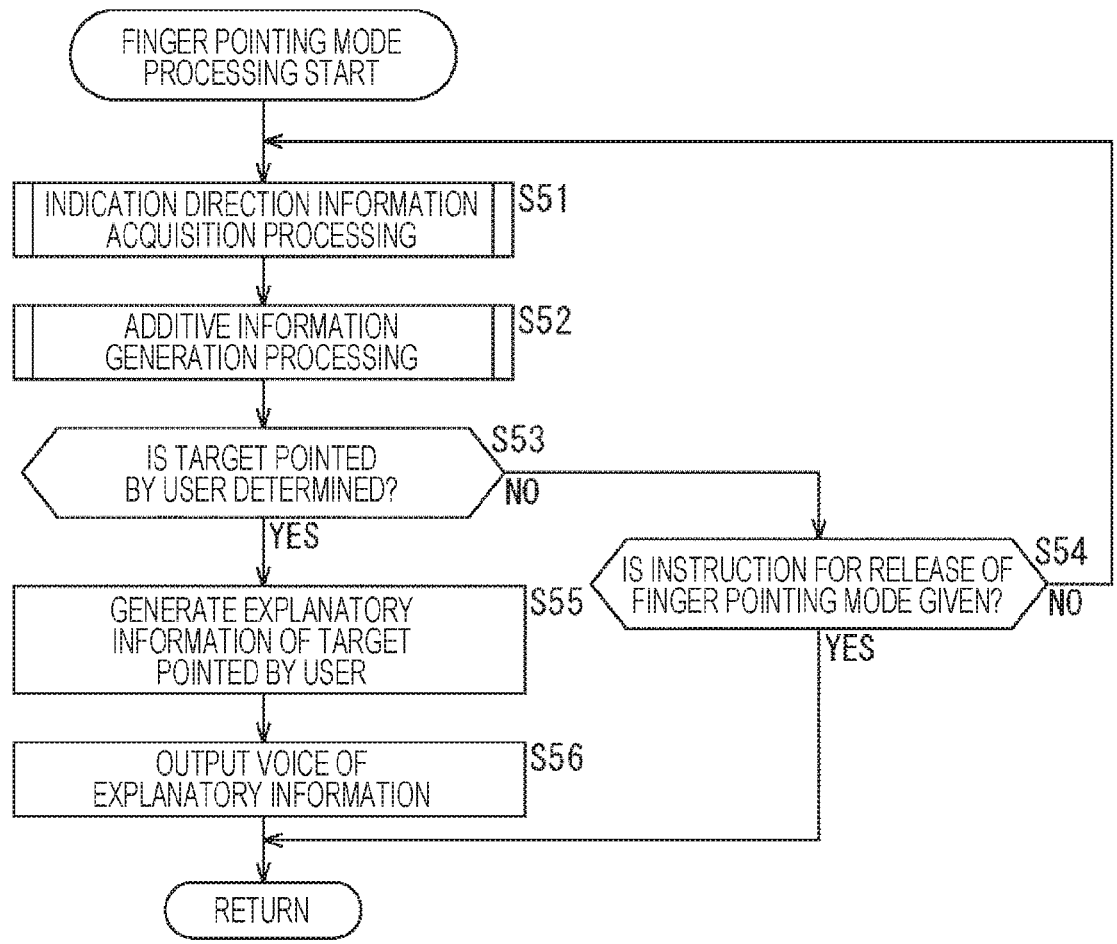
FIG. 3 is a flowchart illustrating details of finger pointing mode processing.
Figure 4:
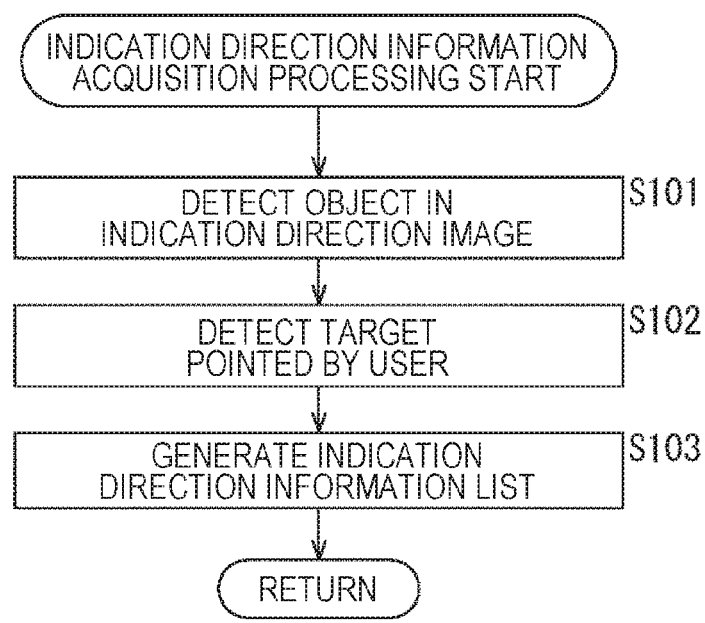
FIG. 4 is a flowchart illustrating details of indication direction information acquisition processing.

First, information processing executed by the information processing system 10 will be described with reference to a flowchart of FIG. 2. Furthermore, for example, the processing is initiated when a power supply (not illustrated) of the information processing unit 12 is turned on, and is terminated when the power supply is turned off.

In step S1, the indication target detection unit 31 determines whether or not the user points something with a finger. Specifically, the indication target detection unit 31 performs detection of a gesture by a user's finger on the basis of a sensor signal transmitted from the sensor unit 22. Furthermore, as a gesture detection method, an arbitrary method can be employed. In addition, the indication target detection unit 31 determines whether or not the user is pointing something with a finger on the basis of a gesture that is detected. The determination processing in step S1 is repetitively executed until it is determined that the user points something with a finger, for example, at a predetermined interval. In addition, in a case where it is determined that the user points something with a finger, the processing proceeds to step S2.

In step S2, the information processing system 10 executes a finger pointing mode processing. Here, details of the finger pointing mode processing will be described with reference to a flowchart of FIG. 3.

In step S51, the information processing unit 12 executes indication direction information acquisition processing. Here, details of the indication direction information acquisition processing will be described with reference to a flowchart of FIG. 4.

In step S101, the object detection unit 32 detects an object in an indication direction image. Specifically, the object detection unit 32 acquires the indication direction image from the photographing unit 21, and performs image recognition to detect an object in the indication direction image, that is, an object that exists within a predetermined range in a direction that is pointed by a user's finger. In addition, the object detection unit 32 detects a position and a size in the indication direction image of the detected object, an object type, visual contents of the object, visual characteristics (for example, a color and a shape) of the object, and the like. In addition, the object detection unit 32 performs recognition of information indicated by the visual contents. For example, the object detection unit 32 recognizes specific contents such as an image, a character string, a mark, and a message which are included in the visual contents.

Furthermore, as a detection method of the object detection unit 32, an arbitrary method can be employed.

Figure 5:
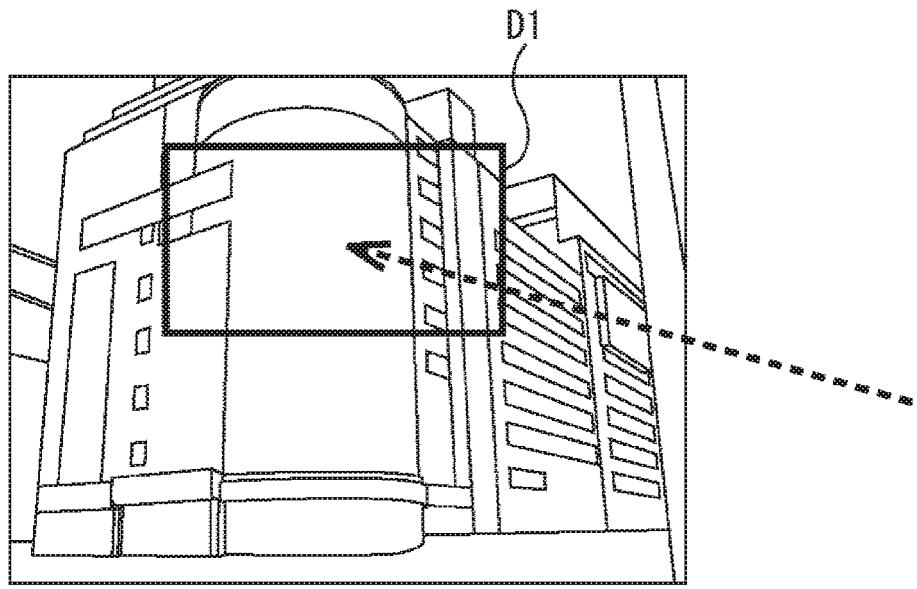
FIG. 5 is a view illustrating an example of a photographing range of an indication direction image.

In addition, hereinafter, description will be given of a case where an image in a range D1 in a landscape of business quarters as illustrated in FIG. 5 is obtained as the indication direction image. Furthermore, in this drawing, signboards of buildings, and the like are not illustrated.

Figure 6:
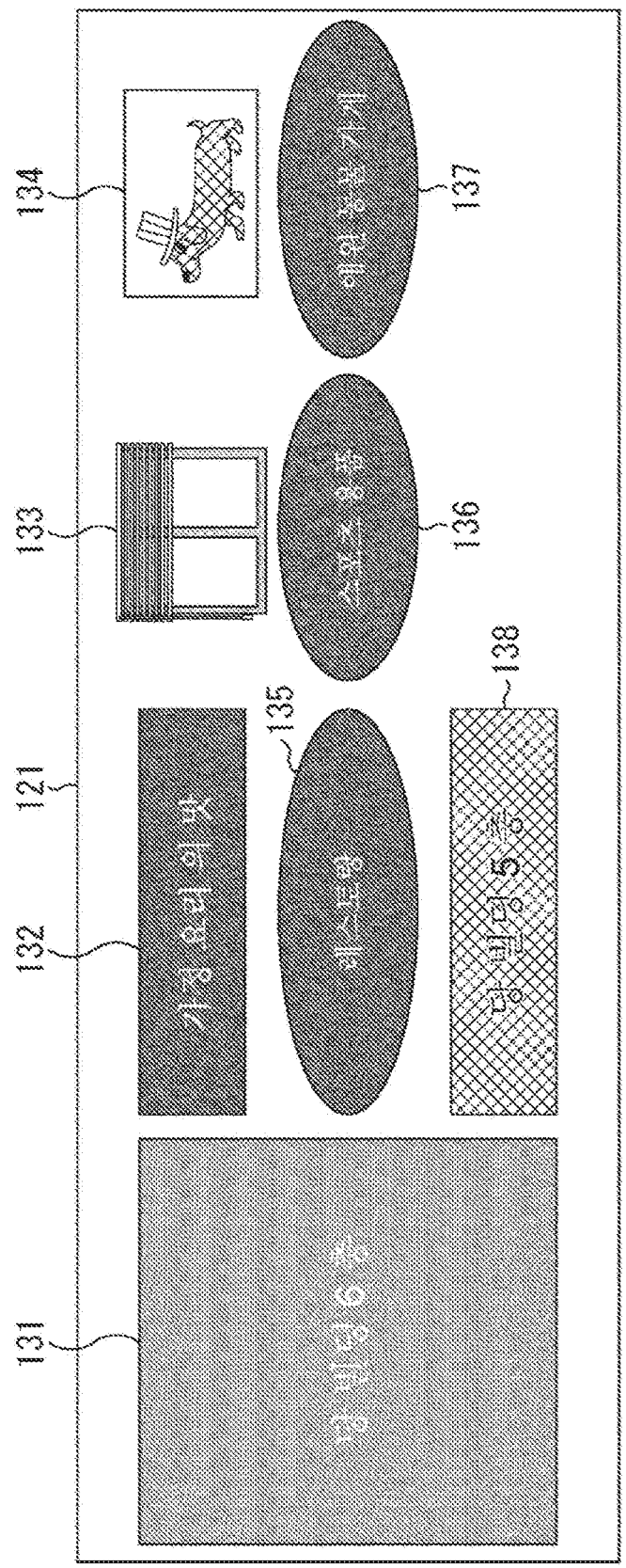
FIG. 6 is a view illustrating an example of the indication direction image.

FIG. 6 schematically illustrates a specific example of an indication direction image 121 in the range D1 in FIG. 5. In the indication direction image 121, a signboard 131, a signboard 132, a window 133, and a signboard 134 to a signboard 138 are photographed. Furthermore, the indication direction image 121 is illustrated as a monochrome image. However, actually, respective objects have colors. Colors of main portions of the respective objects will be described later.

On a right side of the signboard 131, the signboard 132, the signboard 135, and the signboard 138 are arranged in a vertical direction. On a right side of the signboard 132, the window 133 and the signboard 134 are arranged in a horizontal direction. On a right side of the signboard 135, the signboard 136 and the signboard 137 are arranged in a horizontal direction. The window 133 and the signboard 136 are arranged in a vertical direction. The signboard 134 and the signboard 137 are arranged in a vertical direction.

The signboard 131 has a rectangular shape, and white Korean character strings are displayed on a green background. The Korean character strings represent "6F of this building".

The signboard 132 has a rectangular shape, and white Korean character strings are displayed on a blue background. The Korean character strings represent "taste of home cooking".

The window 133 has an approximately square shape, and a color of a frame is gray.

The signboard 134 has a rectangular shape, and an image (figure) of a dog having a yellow body is displayed on a white background.

The signboard 135 to the signboard 137 each have an elliptical shape, and white Korean character strings are displayed on a blue background. The Korean character strings on the signboard 135 represent "restaurant". The Korean character strings on the signboard 136 represent "sports goods". The Korean character strings on the signboard 137 represent "pet shop".

The signboard 138 has a rectangular shape, and black Korean character strings are displayed on a yellow background. The Korean character strings represent "5F of this building".

Furthermore, with regard to a case where the indication direction image 121 in FIG. 6 is obtained, a specific example of each processing will be described.

In step S102, the indication target detection unit 31 detects a target (indication target) that is pointed by a user. For example, in a case where an object detected by the object detection unit 32 exists at the center of the indication direction image, the indication target detection unit 31 detects the object as the indication target. On the other hand, in a case where an object detected by the object detection unit 32 does not exist at the center of the indication direction image, the indication target detection unit 31 detects an object closest to the center of the indication direction image as the indication target.

Figure 7:
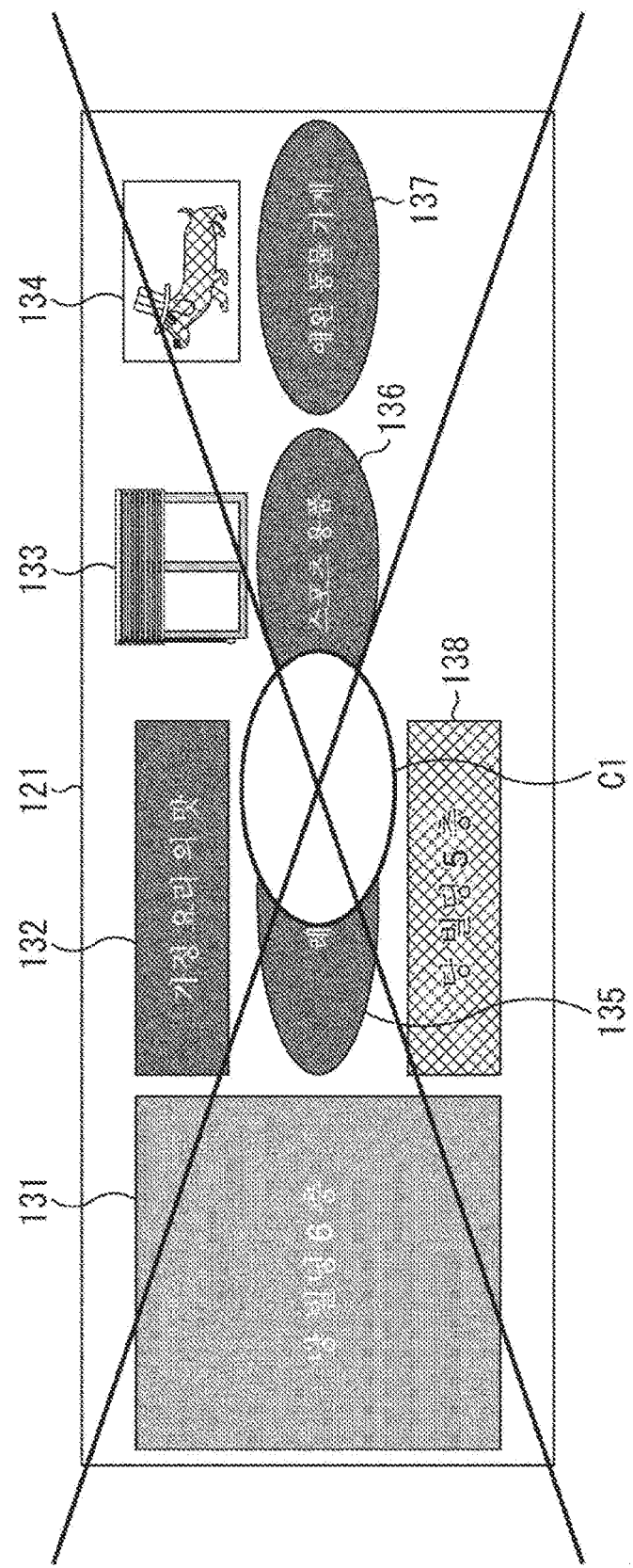
FIG. 7 is a view illustrating an example of a method of detecting an indication target.

For example, as illustrated in FIG. 7, in the indication direction image 121, the signboard 135 exists in a central region C1. Accordingly, the signboard 135 is detected as the indication target.

In step S103, the information generation unit 34 generates an indication direction information list. The indication direction information list is a list of a plurality of pieces of information associated with respective objects detected in the indication direction image.

FIG. 8 illustrates an example of the indication direction information list that is generated on the basis of the indication direction image 121 in FIG. 6.

The indication direction information list includes items of an ID, a position, a size, an object type, a content type, detail information, and an adjacent object. The detail information includes items of content information, translation information, a foreground color, a background color, and a shape.

The ID is applied to each object to uniquely identify each object. In this example, an ID1 to an ID8 are respectively applied to the signboard 131, the signboard 132, the window 133, and the signboards 134 to 138.

The position represents a position of each object in the indication direction image. For example, coordinates of the center of each object in the indication direction image are set.

The size represents a size of each object in the indication direction image. For example, the maximum value of a length of each object in a vertical direction and the maximum value of a length of each object in a horizontal direction in the indication direction image are set.

The object type represents a type of an object detected by the object detection unit 32. For example, the object type of the signboard 131, the signboard 132, and the signboards 134 to 138 is "signboard", and the object type of the window 133 is "window".

Basically, the content type represents a type of a visual content of each object detected by the object detection unit 32. However, with regard to an object that does not have the visual content, a visual content type is set to "object". For example, the content type of the signboard 131, the signboard 132, and the signboard 138 is "sentence". In addition, for example, the content type of the signboard 135 to the signboard 137 is "word". Furthermore, in a case where only one word is included in visual content, the content type is set to "word", and in a case where two or more words are included in the visual content, the content type is set to "sentence". In addition, for example, the content type of the signboard 134 is "image". The window 133 does not have visual content, and thus the content type is set to "object".

In a case where the content type is an object that is the "object", that is, in the case of an object that does not have the visual content, the object type is set as the content information. On the other hand, in a case where the content type is an object other than the "object", that is, in the case of an object including a visual content, the content of the visual content are set.

For example, the signboard 134 includes an image as the visual content, and thus "dog" that is the content of the image is set as the content information. The window 133 does not have the visual content, and thus "window" that is an object type is set as the content information. The signboard 131, the signboard 132, and the signboard 135 to the signboard 138 include a sentence or a word as the visual content, and thus the sentence or the word is set as the content information in an original language (in this example, in the Korean language). That is, in this specification, a plurality of pieces of content information of the signboard 131, the signboard 132, and the signboard 135 to the signboard 138 may be respectively regarded as being defined as "original language information of the signboard 131", "original language information of the signboard 132", "original language information of the signboard 135", "original language information of the signboard 136", "original language information of the signboard 137", and "original language information of the signboard 138".

Information, which is translated into a language (hereinafter, referred to as "user language") used in notification of the content information to a user by the translation unit 33, is set as the translation information. Here, the user language may be regarded as being the same as a language of a user voice.

As the foreground color, a specific color among colors included in the foreground of each object is set. For example, in the case of the signboard 131, the signboard 132, and the signboards 135 to 138, colors of characters displayed on the signboards are set as the foreground color. In the case of the window 133, "transparent" that is a window color is set. In the case of the signboard 134, "yellow" that is a main color of the dog image is set.

As the background color, a specific color among colors included in the background of each object is set. For example, in the case of the signboard 131, the signboard 132, and the signboard 134 to signboard 138, a main color of the background of each of the signboards is set. In the case of the window 133, for example, "gray" that is a color of a frame of the window 133 is set.

As the shape, a shape of each object is set.

As the adjacent object, IDs of objects, which are adjacent to each object on an upper side, on a lower side, on a left side, and on a right side in the indication direction image, are set. For example, since the signboard 132, the signboard 138, the signboard 131, and the signboard 136 are respectively adjacent to the signboard 135 of an ID5 on the upper side, on the lower side, on the left side, and on the right side, ID2, ID8, ID1, and ID6 are respectively set in "upper", "lower", "left", and "right" in a column of "adjacent object".

Then, the indication direction information acquisition processing is terminated.

Returning to FIG. 3, in step S52, the information generation unit 34 executes additive information generation processing. Here, details of the additive information generation processing will be described with reference to a flowchart of FIG. 9.

In step S151, the information generation unit 34 selects one object of which additive information is not generated among objects which are registered in the indication direction information list.

In step S152, the information generation unit 34 selects a template suitable for an object that is selected.

Here, the template is configured to mechanically generate additive information, and is prepared in advance for every object type, or for every combination of the object type and the content type, for example.

For example, in a case where the object type is a signboard, it is possible to use a template of "signboard having a "shape" in which a "content type" of a "foreground color" is displayed on a background of a "background color"".

In addition, for example, in a case where the object type is a window, it is possible to use a template of "window that has a "foreground color" and a "shape" that includes a frame of a "background color"".

Furthermore, data of corresponding items of the indication direction information list can be applied to the "content type", the "foreground color", the "background color", and the "shape" of the templates.

In step S153, the information generation unit 34 generates additive information on the basis of a template that is selected. Specifically, the information generation unit 34 generates the additive information applying data of the indication direction information list of the selected object to a template that is selected.

FIG. 10 illustrates an example of the additive information that is generated on the basis of the indication direction information list of FIG. 8

For example, with regard to additive information of the signboard 131 of ID1, the background color is green, the foreground color is white, the content type is a sentence, and the shape is a rectangular shape, and thus the additive information becomes ""rectangular" signboard in which a "white" "sentence" is displayed on a "green" "background"". With regard to additive information of the window 133 of ID3, the foreground color is transparent, the background color is gray, and the shape is a square, and thus the additive information becomes ""square" window that is "transparent" and includes a "gray" frame". With regard to additive information of the signboard 134 of ID4, the background color is white, the foreground color is yellow, the content type is an image, and the shape is a rectangular shape, and thus the additive information becomes ""rectangular" signboard in which a "yellow" "image" is displayed on a "white" background".

Furthermore, strictly speaking, in the example of FIG. 10, the additive information becomes a portion other than an object type (for example, a signboard and a window).

In addition, at this point of time, the additive information of each object is generated on the basis of only visually recognizable characteristics of each of the individual object. That is, at this point of time, the additive information of each object is generated on the basis of a visual attribute such as a color and a shape of each object.

In step S154, the information generation unit 34 determines whether or not the additive information of all of the objects is generated. In a case where it is determined that the additive information of all of the objects is not generated yet, the processing returns to step S151.

Then, in step S154, the processing from steps S151 to S154 is repetitively executed until it is determined that the additive information of all of the objects is generated. According to this configuration, the additive information of all of the objects registered in the indication direction information list is generated.

On the other hand, in step S154, in a case where it is determined that the additive information of all of the objects is generated, the processing proceeds to step S155.

In step S155, the information generation unit 34 determines whether or not similar additive information exists. In a case where it is determined that similar additive information exists, the processing proceeds to step S156.

For example, in the case of the example in FIG. 10, the signboard 135 to the signboard 137 of ID5 to ID7 are similar in the additive information, and thus it is determined that similar additive information exists.

Furthermore, even in a case where complete matching is not established in the additive information, for example, in a case where only the "foreground color" or the "background color" is different and colors thereof are similar to each other, in a case where only the "shape" is different, and shapes are similar to each other, or the like, it is determined that similar additive information exists.

In step S156, the information generation unit 34 selects one set among combinations of similar additive information. That is, in a case where a plurality of sets of combinations of the similar additive information exist, the information generation unit 34 selects one set among the combinations. On the other hand, in a case where only one set of combination of the similar additive information exists, the information generation unit 34 selects the combinations.

In step S157, the information generation unit 34 adds information for distinguishing the similar additive information.

For example, the information generation unit 34 adds information based on a position of each object to make the similar additive information be non-similar. For example, the information generation unit 34 adds position information to the plurality of pieces of each similar additive information by using a template of ""type of an "order"$^{th}$ object" from a "direction" in the "additive information"".

Furthermore, additive information before addition of new information of each object is applied to "additive information" of the template. The "direction" and the "order" are set on the basis of data of "adjacent object" in the indication direction information list. Data of "object type" in the indication direction information list is applied to the "object type".

FIG. 11 illustrates an example in which position information is added to the additive information in FIG. 10 to make additive information of the signboard 135 to the signboard 137 of ID5 to ID7 be non-similar.

For example, the signboard 135 to the signboard 137 which are similar in the additive information are arranged in a horizontal direction. In addition, among the signboard 135 to the signboard 137, the signboard 135 is the first signboard from the left, the signboard 136 is the second signboard from the left, and the signboard 137 is the third signboard from the left.

Accordingly, on the basis of the template, the additive information of the signboard 135 is updated to "a "first" "signboard" from the "left" among "elliptical" signboards in which a "white" "word" is displayed on a "blue" background". The additive information of the signboard 136 is updated to "a "second" "signboard" from the "left" among "elliptical" signboards in which a "white" "word" is displayed on a "blue" background". The additive information of the signboard 137 is updated to "a "third" "signboard" from the "left" among "elliptical" signboards in which a "white" "word" is displayed on a "blue" background".

Alternatively, for example, the information generation unit 34 adds information indicating visually recognizable characteristics at the periphery of each object to make the additive information be non-similar. For example, the information generation unit 34 adds information associated with objects adjacent to each object to respective pieces of similar additive information by using a template of "among "a plurality of pieces of additive information", an object type having "information associated with an object that is adjacent" in a "direction"".

Furthermore, additive information before addition of new information of each object is applied to "additive information" of the template. The "direction" is set on the basis of data of "adjacent object" in the indication direction information list. The "information associated with an object that is adjacent" indicates types of objects adjacent to each object, characteristics thereof, and the like, and is set on the basis of one or more combinations among an "object type", a "content type", a "foreground color", a "background color", and a "shape" of nearby objects which are registered in the indication direction information list. Furthermore, it is preferable that information associated with an object having, particularly, visual characteristics among objects which are adjacent to each object is set to the "information associated with an object that is adjacent". Data of an "object type" in the indication direction information list is applied to the "object type".

FIG. 12 illustrates an example in which information associated with objects adjacent to each object is added to the additive information in FIG. 10 to make the additive information of the signboard 135 to the signboard 137 of ID5 to ID7 be non-similar.

For example, the signboard 131 having a green background exists on the left of the signboard 135. Here, the additive information of the signboard 135 is updated to "a "signboard" in which a "green signboard" exists on the "left" among "elliptical" signboards in which a "white" "word" is displayed on a "blue" background".

In addition, for example, the window 133 exists on an upper side of the signboard 136, and other windows do not exist. Here, the additive information of the signboard 136 is updated to "a "signboard" in which a "window" exists on an "upper side" among "elliptical" signboards in which a "white" "word" is displayed on a "blue" background".

In addition, for example, the signboard 134 on which a yellow dog image is displayed exists on an upper side of the signboard 137. Here, the additive information of the signboard 137 is updated to "a "signboard" in which a "yellow image" exists on an "upper side" among "elliptical" signboards in which a "white" "word" is displayed on a "blue" background".

Furthermore, strictly speaking, in the examples in FIG. 11 and FIG. 12, the additive information is a portion other than an object type (for example, a signboard and a window).

In this manner, as in the signboard 135 to the signboard 137, in a case where visually recognizable characteristics of an individual object, and visually recognizable characteristics at the periphery of the object are similar, additive information is generated on the basis of at least one of a position of the object, the visually recognizable characteristics at the periphery of the object in addition to the visually recognizable characteristics of the individual object. On the other hand, as in the signboard 131, the signboard 132, the window 133, the signboard 134, and the signboard 138, in a case where visually recognizable characteristics of an individual object and visually recognizable characteristics at the periphery of the object are not similar, the additive information is generated on the basis of only the visually recognizable characteristics of the individual object.

Returning to FIG. 9, after the processing in step S157, the processing returns to step S155.

Then, in step S155, the processing of steps S155 to S157 is repetitively executed until it is determined that similar additive information does not exist.

On the other hand, in step S155, in a case where it is determined that the similar additive information does not exist, the additive information generation processing is terminated.

Returning to FIG. 3, in step S53, the indication target detection unit 31 determines whether or not a target that is pointed by a user is determined. For example, in a case where a duration of a state in which an indication target is not changed is less than a predetermined time, the indication target detection unit 31 determines that a target that is pointed by the user is not determined yet, and the processing proceeds to step S54.

In step S54, the indication target detection unit 31 determines whether or not an instruction for release of the finger pointing mode is given. Specifically, as in the processing in step S1 of FIG. 2, the indication target detection unit 31 performs detection of a gesture by a user's finger on the basis of a sensor signal that is transmitted from the sensor unit 22, and detects whether or not a gesture that gives the instruction for release of the finger pointing mode is performed. For example, the gesture that gives the instruction for release of the finger pointing mode may be stopping of the finger pointing gesture, or making of a predetermined finger shape. In addition, in a case where the gesture that gives the instruction for release of the finger pointing mode is not performed, the indication target detection unit 31 determines that the instruction for release of the finger pointing mode is not given, and the processing returns to step S51.

Then, the processing in steps S51 to S54 is repetitively executed until it is determined in step S53 that a target that is pointed by a user is determined, or it is determined in step S54 that the instruction for release of the finger pointing mode is given.

On the other hand, for example, in a case where the duration of the state in which the indication target is not changed is equal to or longer than the predetermined time, in step S53, the indication target detection unit 31 determines that a target that is pointed by the user is determined, and the processing proceeds to step S55.

In step S55, the output control unit 35 generates explanatory information of the target that is pointed by the user. For example, the output control unit 35 generates the explanatory information by using a template that is different depending on whether or not the target (indication target) pointed by the user includes visual content.

For example, in a case where the content type of the indication target is "object", that is, the indication target does not have visual content, the output control unit 35 generates the explanatory information by using a template of "this is "additive information"".

Furthermore, additive information of each object is applied to the "additive information" of the template.

For example, in a case where the indication target is the window 133, the content type of the window 133 is "object", and thus the template can be used. In addition, explanatory information of "this is a "square window which is transparent and of which a frame is gray"" is generated by using additive information corresponding to the window 133 of ID3 in FIG. 11 or FIG. 12.

In addition, for example, in a case where the content type of the indication target is a type other than "object", that is, in a case where the indication target has visual content, the output control unit 35 generates explanatory information on the basis of a template of """additive information" is "translation information"""".

Furthermore, additive information of each object is applied to the "additive information" of the template. Data of "translation information" of the indication direction information list is applied to the "translation information".

For example, in a case where the indication target is the signboard 135, a content type of the signboard 135 is "word", and thus the template can be used. In addition, explanatory information of "a "first signboard from the left among elliptical signboards in which a white word is displayed on a blue background" is "restaurant"" is generated by using data of translation information of ID5 in FIG. 8 and additive information of ID5 in FIG. 11. Alternatively, explanatory information of "a "signboard in which a green signboard exists on the left side among elliptical signboards in which a white word is displayed on a blue background" is "restaurant"" is generated by using data of translation information of ID5 in FIG. 8 and additive information of ID5 in FIG. 12.

In step S56, the output unit 13 outputs a voice of the explanatory information generated in the processing in step S55 under control of the output control unit 35.

According to this configuration, a user can accurately understand an indication target that is recognized by the information processing system 10 on the basis of the additive information, and the user can accurately determine whether or not the indication target matches a target that is recognized as being pointed by the user. In addition, even in a case where information is displayed on the current indication target in the Korean language which cannot be understood, the user can obtain the information in a language that can be understood, that is, in the user language.

For example, if the additive information is not applied, even when a translation voice of character strings on a signboard is output, there is a possibility that it is difficult for the user to be confident of the translation content corresponding to a desired signboard. In addition, for example, even when a translation voice of character strings on a signboard different from the desired signboard is output, there is a possibility that the user may fail to notice this situation.

On the other hand, when additive information is applied, the user can accurately determine whether or not the content of a translation voice of character strings on a signboard corresponds to a desired signboard. In addition, for example, even when a translation voice of character strings on a signboard different from the desired signboard is output, it is easy for the user to notice this situation.

Then, the finger pointing mode processing is terminated.

On the other hand, in step S54, in a case where it is determined that the instruction for release of the finger pointing mode is given, the processing in steps S55 and S56 is skipped, and the finger pointing mode processing is terminated.

Returning to FIG. 2, the processing returns to step S1, and processing in step S1 and subsequent steps is executed.

As described above, the user can simply acquire accurate content information of a desired target by pointing the desired target.

2. Modification Example

Hereinafter, a modification example of the embodiment of the present technology will be described.

{Modification Example Related to Application Range of Present Technology}

An application range of the present technology is not limited to the above-described examples.

For example, in the present technology, an object that becomes the indication target is not necessary to be the entirety of one object, and may be a part of the object. For example, in a case where a plurality of character strings or images are displayed on one signboard, a part of the plurality of character strings or images may be designated as the indication target. In addition, for example, a part of a big target such as a building may be designated as the indication target.

In addition, description has been given of an example of a case where a distant signboard and the like are pointed as an application situation of the present technology. However, the present technology is also applicable to various situations in which a desired position is pointed in a contactless manner by using an indicating object. Examples of the situations include the case of pointing a desired position in a showcase of a museum and the like, the case of pointing a desired position in a location that is difficult to approach due to entrance restriction, the case of pointing a desired position in a landscape in front of an observation tower, the case of pointing a desired position of an object with which direct contact is difficult due to contamination, the case of pointing a desired position of an object for which contact is prohibited, and the case of pointing a desired position from a distant position in a lecture meeting and the like.

In addition, for example, the present technology is also applicable to the case of pointing a desired position through direct contact with a target. For example, the present technology is also applicable to the case of bringing a finger and the like into direct contact with a screen of a display device such as a display to point a desired position in an image displayed on the screen. Particularly, in a case where an image is small and thus it is difficult to accurately point individual targets, an application effect of the present technology is enhanced.

{Modification Example Related to Configuration Example of System}

The configuration example of the information processing system 10 in FIG. 1 is illustrative only, and can be changed in correspondence with the necessity.

For example, partial functions of the information processing unit 12 may be provided in the information acquisition unit 11 or the output unit 13. In addition, for example, two or more of the information acquisition unit 11 the information processing unit 12, and the output unit 13 may be integrated with each other. In addition, for example, constituent elements of the information processing system 10 may be configured by a combination different from the information acquisition unit 11, the information processing unit 12, and the output unit 13.

In addition, for example, partial functions of the information processing system 10 may be provided at the outside.

{Modification Example Related to Additive Information}

A method of generating the additive information is not limited to the above-described example, and other methods can also be employed.

For example, the information amount of the additive information may be controlled by comparing the indication target and visually recognizable characteristics at the periphery of the indication target without using a template. For example, the information amount of the additive information may be controlled to a certain extent capable of identifying the indication target from the periphery.

Specifically, for example, in the case of generating the additive information on the basis of the visually recognizable characteristics of an individual indication target, among the visually recognizable characteristics of the individual indication target, a characteristic different from the visually recognizable characteristics at the periphery of the indication target may be preferentially included in the additive information. Particularly, among the visually recognizable characteristics of the individual indication target, a characteristic that has a large visual difference from the periphery of the indication target may be preferentially included in the additive information. For example, in a case where an object having a color similar to a color of the indication target does not exist at the periphery, only the color of the indication target may be included in the additive information. In addition, in a case where an object having a combination of a color and a shape, which is similar to a combination of a color and a shape of the indication target, does not exist at the periphery, only the color and the shape of the indication target may be included in the additive information.

In addition, in the case of adding the visually recognizable characteristics at the periphery of the indication target to the additive information, among the visually recognizable characteristics at the periphery of the indication target, a characteristic having a large visual difference in comparison to the other characteristics may be preferentially added to the additive information.

In addition, for example, the additive information may be generated on the basis of only the visually recognizable characteristics at the periphery of the indication target without using visually recognizable characteristics of the individual indication target. For example, in a case where a visually remarkable object B exists on the left of an object A that is the indication target, additive information such as an "object A in which an object B exists on the left" may be generated.

In addition, as described above, as information that is included in the additive information, the visually recognizable characteristics of the individual indication target, a position of the indication target, and the visually recognizable characteristics at the periphery of the indication target can be exemplified, but an information type that is included in the additive information is not limited to the example.

Examples of the visually recognizable characteristics of the individual indication target include visual attributes (for example, a color, a shape, and a pattern) of the indication target, movement of the indication target, a variation of the visual attributes, and a material. Examples of a position of the indication target include an absolute position of the indication target, and a relative position between the indication target and a nearby object and the like. Examples of the visually recognizable characteristics at the periphery of the indication target include an object at the periphery of the indication target and visually recognizable characteristics thereof, and a visually recognizable situation at the periphery of the indication target. For example, a portion "with a line of people" of a "restaurant with a line of people" is classified to visually recognizable characteristics at the periphery of a restaurant instead of visually recognizable characteristics of an individual restaurant.

{Modification Example Related to Detection Method of Indication Target}

Description has been given of an example in which an indication target pointed by a user's finger is detected on the basis of an indication direction image photographed by the photographing unit 21 of the information acquisition unit 11 that is mounted on the user's finger, but the indication target may be detected by another method.

For example, a photographing unit that photographs an indication direction image that indicates a direction pointed by a user may be mounted on a portion (for example, a head) other than the user's finger, and a photographing unit that photographs the user may be additionally provided. In this case, for example, the indication target detection unit 31 detects a direction (hereinafter, referred to as "spatial indication direction") pointed by the user in a three-dimensional space by detecting a position and a direction of the user's finger, and the like on the basis of an image obtained by photographing the user. In addition, the indication target detection unit 31 detects an indication target, which is pointed by the user, in the indication direction image on the basis of the spatial indication direction.

Furthermore, in a case where the photographing unit that photographs the indication direction image is mounted on a portion other than the user's finger, a photographing direction and a direction pointed by the user may not match each other in some cases. In contrast, for example, the indication target detection unit 31 can create a spatial map of the periphery of the user on the basis of the indication direction image by using a simultaneous localization and mapping (SLAM), and can detect the indication target on the basis of the spatial map and the spatial indication direction.

In addition, for example, the photographing unit that photographs the indication direction image may be provided separately from the user without being mounted on the user.

{Modification Example Related to Indicating Object}

As the indicating object capable of being applied to the present technology, an arbitrary indicating object can be employed as long as the indicating object can point a desired position. For example, a part of body other than the user's finger, such as an eye, a head, a face, a part of the face, an arm, and a part of the arm may be used as the indicating object, and the desired position may be pointed by a gesture and the like using the portions. In addition, for example, a pointing device such as a laser pointer, and a device such as a virtual reality (VR) device may be used as the indicating object. Furthermore, in the case of using the VR device as the indicating object, for example, a desired direction can be pointed by a direction of, for example, the VR device.

{Modification Example Related to Indication Direction Information List}

Items of the indication direction information list are not limited to the above-described example, and can be changed in correspondence with necessity. For example, the detail information may include visual characteristics (for example, a pattern and a material) in addition to a color and a shape of each object.

In addition, a method of classifying the object type and the content type is not limited to the above-described examples, and can be changed in correspondence with necessity.

In addition, for example, information associated with an object that is adjacent in an inclined direction may be added to the indication direction information list, and the information associated with the object that is adjacent in the inclined direction may be added to the additive information.

Other Modification Examples

Description has been given of an example in which the content information of the indication target is translated from the Korean language into the user language, but a combination of translation languages is not limited to the example. In addition, for example, a language (a language used in notification to a user) of a translation destination may be set by the user.

In addition, for example, the additive information, the explanatory information, and the like are generated in an original language (for example, the Korean language) that is included in the visual content of the indication target at once, and a language (for example, a user language) used in notification of the explanatory information may be translated from the original language.

In addition, for example, text data of the explanatory information may be displayed on a display and the like instead of a voice of the explanatory information.

{Configuration Example of Computer}

The above-described series of processing can be executed by hardware or software. In the case of executing the series of processing by software, a program that constitutes the software is installed in a computer. Here, examples of the computer include a computer provided with exclusive hardware, and for example, a general-purpose personal computer capable of executing various functions by installing various programs.

Figure 13:
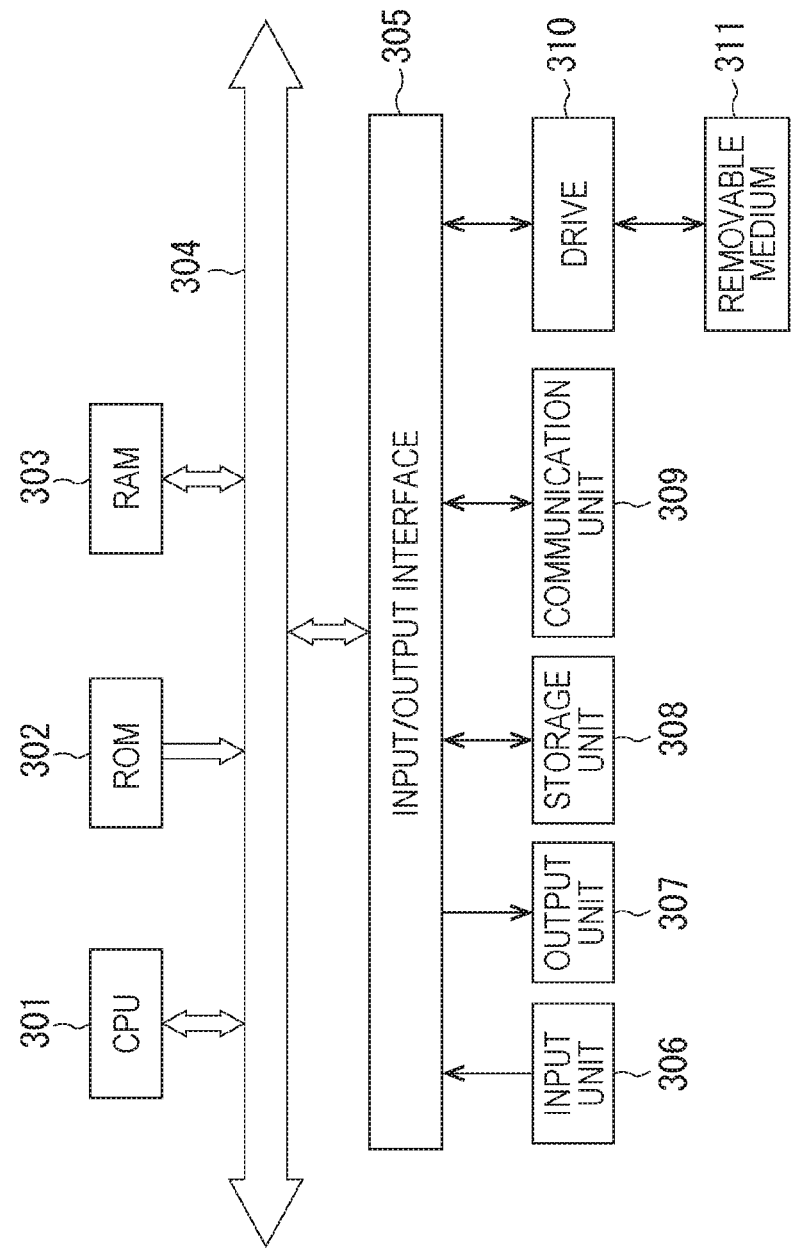
FIG. 13 is a block diagram illustrating a configuration example of a computer.

FIG. 13 is a block diagram illustrating a configuration example of computer hardware that executes the above-described series of processing by a program.

In the computer, a central processing unit (CPU) 301, a read only memory (ROM) 302, and a random access memory (RAM) 303 are connected to each other through a bus 304.

In addition, an input/output interface 305 is connected to the bus 304. An input unit 306, an output unit 307, a storage unit 308, a communication unit 309, and a drive 310 are connected to the input/output interface 305.

The input unit 306 includes a keyboard, a mouse, a microphone, and the like. The output unit 307 includes a display, a speaker, and the like. The storage unit 308 includes a hard disk, a non-volatile memory, and the like. The communication unit 309 includes a network interface, and the like. The drive 310 drives a removable medium 311 such as a magnetic disk, an optical disc, a magneto-optical disc, and a semiconductor memory.

In the computer having the above-described configuration, the CPU 301 loads a program stored, for example, in the storage unit 308 into the RAM 303 through the input/output interface 305 and the bus 304 and executes the program, whereby the above-described series of processing is performed.

The program that is executed by the computer (CPU 301) can be provided, for example, in a state of being recorded in the removable medium 311 as package media, and the like. In addition, the program can be provided through a wired or wireless transmission medium such as a local area network, the Internet, and digital satellite broadcasting.

In the computer, when the removable medium 311 is mounted in the drive 310, the program can be installed in the storage unit 308 through the input/output interface 305. In addition, the program can be received by the communication unit 309 through a wired or wireless transmission medium, and can be installed in the storage unit 308. In addition, the program can be installed in the ROM 302 or the storage unit 308 in advance.

Furthermore, the program that is executed by the computer may be a program in which processing is performed in time-series according to the procedure described in this specification, or may be a program in which processing is performed in parallel or at a necessary timing such as when a call is made.

In addition, a plurality of the computers may perform the above-described processing in cooperation with each other. In addition, a computer system is constituted by a single computer or a plurality of computers which perform the above-described processing.

In addition, in this specification, the system represents an assembly of a plurality of constituent elements (devices, modules (parts), and the like), and whether or not the entirety of the constituent elements exist in the same casing does not matter. Accordingly, all of a plurality of devices which are accommodated in individual casings and are connected through a network, and one device in which a plurality of modules are accommodated in one casing represent the system.

In addition, an embodiment of the present technology is not limited to the above-described embodiment, and various modifications can be made in a range not departing from the gist of the present technology.

For example, the present technology can have a cloud computing configuration in which one function is shared by a plurality of devices and is processed in cooperation through a network.

In addition, the respective steps described in the flowchart can be executed in a state of being shared by a plurality of devices in addition to execution by one device.

In addition, in a case where a plurality of kinds of processing are included in one step, the plurality of kinds of processing included in one step can be executed in a state of being shared by a plurality of devices in addition to execution by one device.

In addition, the effects described in this specification are illustrative only, and other effects may be provided.

In addition, for example, the present technology can also employ the following configurations.

(1)

An information processing device, including:

an indication target detection unit that detects an indication target that is a target pointed by an indicating object in a three-dimensional space;

an information generation unit that generates explanatory information that includes content information indicating visually recognizable content of the indication target, and additive information indicating visually recognizable characteristics associated with the indication target; and an output control unit that controls output of a voice of the explanatory information.

(2)

The information processing device according to (1), in which the information generation unit compares the visually recognizable characteristics of the individual indication target, and visually recognizable characteristics at a periphery of the indication target to control an information amount of the additive information.

(3)

The information processing device according to (2), in which the information generation unit controls the information amount of the additive information to a certain extent capable of identifying the indication target from the periphery.

(4)

The information processing device according to (3), in which the information generation unit generates the additive information on the basis of only the visually recognizable characteristics of the individual indication target in a case where the visually recognizable characteristics of the individual indication target and the visually recognizable characteristics at the periphery of the indication target are not similar, and generates the additive information on the basis of at least one of a position of the indication target and the visually recognizable characteristics at the periphery of the indication target, in addition to the visually recognizable characteristics of the individual indication target in a case where the visually recognizable characteristics of the individual indication target and the visually recognizable characteristics at the periphery of the indication target are similar.

(5)

The information processing device according to (4), in which in the case of generating the additive information on the basis of only the visually recognizable characteristics of the individual indication target, the information generation unit allows a characteristic, which is different from the visually recognizable characteristics of the periphery of the indication target, among the visually recognizable characteristics of the individual indication target to be preferentially included in the additive information.

(6)

The information processing device according to any one of (1) to (5), in which the visually recognizable characteristics of the individual indication target include a visual attribute of the indication target.

(7)

The information processing device according to any one of (1) to (6), further including:

a translation unit that translates the content information into a predetermined language, in which the output control unit controls output of the voice of the explanatory information in the predetermined language.

(8)

The information processing device according to any one of (1) to (7), in which the content information indicates at least one of a name of the indication target, a type of the indication target, and a thing that is visually expressed by the indication target.

(9)

The information processing device according to any one of (1) to (8), in which the indicating object is a part of a body of a user.

(10)

The information processing device according to any one of (1) to (9), further including:

an object detection unit that performs detection of an object in an image obtained by photographing a periphery of the indication target, in which the indication target detection unit detects the indication target among objects in the image.

(11)

An information processing method, including:

an indication target detection step of detecting an indication target that is a target pointed by an indicating object in a three-dimensional space;

an information generation step of generating explanatory information that includes content information indicating visually recognizable content of the indication target, and additive information indicating visually recognizable characteristics associated with the indication target; and an output control step of controlling output of a voice of the explanatory information.

(12)

A program that causes a computer to execute processing including:

an indication target detection step of detecting an indication target that is a target pointed by an indicating object in a three-dimensional space;

an information generation step of generating explanatory information that includes content information indicating visually recognizable content of the indication target, and additive information indicating visually recognizable characteristics associated with the indication target; and an output control step of controlling output of a voice of the explanatory information.

REFERENCE SIGNS LIST

10 Information processing system
11 Information acquisition unit
12 Information processing unit
13 Output unit
21 Photographing unit
22 Sensor unit
31 Indication target detection unit
32 Object detection unit
33 Translation unit
34 Information generation unit
35 Output control unit

The invention claimed is:

1. An information processing device, comprising:
circuitry configured to:
    detect an indication target that is pointed by an indicating object in a three-dimensional space;
    compare visually recognizable characteristics of the indication target and visually recognizable characteristics at a periphery of the indication target;
    determine, based on the comparison, an amount of additive information that is generated, wherein the additive information indicates the visually recognizable characteristics associated with the indication target;
    generate explanatory information based on the determination, wherein the explanatory information includes:
        content information indicating visually recognizable content of the indication target, and
        the additive information; and
    control output of a voice of the explanatory information.

2. The information processing device according to claim 1, wherein the circuitry is further configured to generate, as the additive information of the indication target, a background color of the indication target, a foreground color of the indication target, a content type of the indication target, and a shape of the indication target.

3. The information processing device according to claim 1, wherein the circuitry is further configured to
control the amount of the additive information to a certain extent such that the indication target is identified from the periphery.

4. The information processing device according to claim 3, wherein the circuitry is further configured to
generate the additive information based on the visually recognizable characteristics of the indication target in a case where the visually recognizable characteristics of the indication target and the visually recognizable characteristics at the periphery of the indication target are not similar; and
generate the additive information based on at least one of a position of the indication target, the visually recognizable characteristics at the periphery of the indication target, or the visually recognizable characteristics of the indication target in a case where the visually recognizable characteristics of the indication target and the visually recognizable characteristics at the periphery of the indication target are similar.

5. The information processing device according to claim 4, wherein
in a case where the additive information is generated based on the visually recognizable characteristics of the indication target, the circuitry is further configured to allow a characteristic which is different from the visually recognizable characteristics of the periphery of the indication target among the visually recognizable characteristics of the indication target to be preferentially included in the additive information.

6. The information processing device according to claim 1, wherein
the visually recognizable characteristics of the indication target comprise a visual attribute of the indication target.

7. The information processing device according to claim 1, wherein the circuitry is further configured to:
translate the content information to a determined language; and
control the output of the voice of the explanatory information in the determined language.

8. The information processing device according to claim 1, wherein the content information indicates at least one of a name of the indication target, a type of the indication target, or visual content that is visually expressed by the indication target.

9. The information processing device according to claim 1, wherein the indicating object is a part of a body of a user.

10. The information processing device according to claim 1, wherein the circuitry is further configured to:
execute detection of an object in an image obtained by photographing a image capture of the periphery of the indication target; and
detect the indication target among a plurality of objects in the image.

11. An information processing method, comprising:
detecting an indication target that is pointed by an indicating object in a three-dimensional space;
comparing visually recognizable characteristics of the indication target and visually recognizable characteristics at a periphery of the indication target;
determining, based on the comparison, an amount of additive information that is generated, wherein the additive information indicates the visually recognizable characteristics associated with the indication target;
generating explanatory information based on the determination, wherein the explanatory information includes:
content information indicating visually recognizable content of the indication target, and
the additive information; and
controlling output of a voice of the explanatory information.

12. A non-transitory computer-readable medium having stored thereon, computer-executable instructions which, when executed by a computer, cause the computer to execute operations, the operations comprising:
detecting an indication target that is pointed by an indicating object in a three-dimensional space;
comparing visually recognizable characteristics of the indication target and visually recognizable characteristics at a periphery of the indication target;
determining, based on the comparison, an amount of additive information that is generated, wherein the additive information indicates the visually recognizable characteristics associated with the indication target;
generating explanatory information based on the determination, wherein the explanatory information includes:
content information indicating visually recognizable content of the indication target, and
the additive information; and
controlling output of a voice of the explanatory information.

* * * * *